United States Patent Office 3,494,787
Patented Feb. 10, 1970

3,494,787
ENCAPSULATED PERPHTHALIC ACID COMPOSITIONS AND METHOD OF MAKING SAME
Jan P. Lund and Donald R. Nielsen, Corpus Christi, Tex., assignors to PPG Industries, Inc., Pittsburgh, Pa., a corporation of Pennsylvania
No Drawing. Filed Dec. 19, 1966, Ser. No. 602,558
Int. Cl. C07c 73/10; C23f 11/12; C11d 3/04
U.S. Cl. 117—100         12 Claims

ABSTRACT OF THE DISCLOSURE

Dry compositions of diperphthalic acids encased in a protective coating of hydrated salt such as hydrated magnesium sulfate capable of being effectively admixed with alkaline detergents are disclosed as well as methods for their preparation, including one in which an aqueous dispersion of the acid is fed to a fluidized bed of incompletely or non-hydrated salt particles.

BACKGROUND OF INVENTION

Field of invention

This invention deals with dry compositions of perphthalic acids, notably diperphthalic acids exemplified by diperisophthalic acid. More particularly, it concerns formulations of perphthalic acids, notably diperisophthalic acid, capable of direct admixture with alkaline detergents and methods of the preparation thereof.

Diperphthalic acids such as diperisophthalic acid are capable of liberating active oxygen for bleaching and effecting various oxidizing reactions. Characteristic of these peracids are their tendency to be explosive or detonable when exposed to elevated temperatures or shock. They also tend to decompose in a non-explosive fashion, thereby losing their active oxygen content and hence their bleaching or oxidizing capacity. A further characteristic is their sensitivity to decomposition, usually in a non-explosive fashion, when in contact with alkaline materials such as alkaline synthetic detergents.

According to application Ser. No. 308,323, filed Sept. 12, 1963, now abandoned, and its continuation-in-part application Ser. No. 584,969, filed Oct. 7, 1966, now abandoned, the stability of these perphthalic acids is improved by incorporating with the peracid an alkali metal or alkaline earth metal salt of an acid having an ionization content at 25° C. for the first hydrogen of at least $1 \times 10^{-3}$, preferably not less than $1 \times 10^{-2}$. Among the salts specifically therein mentioned are sodium sulfate, magnesium sulfate, and like alkali metal or alkaline earth metal sulfates such as potassium sulfate, ammonium sulfate, and lithium sulfate. Sodium bisulfate or potassium bisulfate as well as other alkali metal bisulfates are also mentioned. Thus, pursuant to said applications, perphthalic acids may be formulated effectively into compositions which exhibit a materially lower tendency to non-explosive type decomposition than the perphthalic acid itself and thus loss of active oxygen content.

The tendency of these perphthalic acids to explode or detonate can be overcome according to copending application Ser. No. 418,541, filed Dec. 15, 1964, by formulating the peracid with a hydrated salt which retains water of hydration (or crystallization) at a temperature of at least 30° C. but which gives up considerable water of hydration at a temperature of above about 60° C. to as high as 150° C. Among the inorganic hydrated salts specifically identified by said copending application are magnesium sulfate heptahydrate, magnesium nitrate hexahydrate, the recognized hydrates of the various alkali metal aluminum sulfates as well as neutral or acidic hydrates of alkali metal polyphosphates.

SUMMARY OF INVENTION

In accordance with the present invention, it has now been discovered that the ease with which perphthalic acids, notably diperisophthalic acid, tend to lose active oxygen, that is, decompose, when in contact with alkaline materials, especially alkaline synthetic detergents, can be successfully obviated by encapsulating the diperphthalic acid within a protective layer of hydrated inorganic salt. In order to also protect the encapsulated product against detonation or explosion, the hydrated salt should be one which retains its water of hydration or crystallization at temperatures above 30° C. but which gives up considerable water of hydration at temperatures of between 60° C. and 150° C. Thus, this present invention provides a dry particulate or granular composition having a core of the peracid particles encased in a shell or coating of inorganic hydrated salt. The proportion of the hydrated salt and peracid are adjusted, in the preferred compositions hereof, to provide for water of hydration content sufficient to protect against detonation. These hydrated salt encapsulated peracid particulate compositions are thus stabilized against premature liberation of active oxygen and detonability or explosibility, and can be formulated directly with synthetic detergents to provide dry admixtures of detergent and the peracid bleaching granules without undue loss of active oxygen.

The compositions of this invention have as a principal component solid, dry (free of liquid water) particles or granules having as their cores perphthalic acid bleaching agent. Around this core of perphthalic acid is a layer or shell provided by an inorganic hydrated water soluble salt, notably hydrated magnesium sulfate. This shell thus encases the perphthalic acid with a protective barrier which dissolves when the composition is placed in aqueous bleaching media.

Particle size of the hydrated salt encapsulated diperisophthalic acid generally may be varied widely. However, preference is for granular particles which are globular in their principal form and which range from about 0.1 to 5 millimeters in diameter. Various considerations, other than effectively encapsulating the diperphthalic acid particle may be taken into account in the choice of particle size. For one thing, when it is to be directly formulated with granular synthetic detergent, the particle size is varied so as to be compatible therewith. For example, when absence of segregation of the dry diperacid particles from the dry powdery detergent compositions with which it is admixed is important, the particle size and density of the encapsulated diperacid particles are adjusted to insure against any such substantial segregation.

A further consideration bearing upon the makeup of the particulate globular or spherical particles is the proportion of diperisophthalic acid and hydrated salt which will provide protection against detonation. As described in copending application Ser. No. 418,541, the hydrated salt content of the composition should be upwardly of about 0.25 but rarely above 5 parts water of hydration (which releases between 60° C. and 150° C.) per part by weight of the diperacid for the composition to be effectively protected against detonation. Encapsulated compositions containing this hydrated salt content are preferred. Obviously, depending upon the water of crystallization content of the hydrated salt, the total weight contributed by the hydrated salt in the encapsulating coating can vary. Generally, encapsulated compositions having an active oxygen content between 0.05 and 5 or possibly as high as 10 percent by weight (basis the peracid and hydrated salt) are preferred. Further dilution of the diperphthalic acid content by use of larger proportions of hydrated salt and possibly other inert additives is, however, possible.

Characteristically, these dry individual units (particles) of the free flowing encapsulated diperphthalic acid are spherical or globular in shape and range in size upwardly from 0.1 to 5 millimeters in diameter. In referring to the preferred shape of these particles as globular or spherical, it is to be understood that these terms are intended to refer to the predominant or basic configuration of the particle as it appears when viewed under the magnification, for example, of a light microscope. Particle shapes other than globular or spherical can also be present. Even then, the particles are not perfectly globular but rather are essentially of such shape; in other words, the term "globular" is used to epitomize the predominant configuration.

Shell thickness of the encapsulated hydrated salt can vary considerably. Nevertheless, besides the need to provide for sufficient water of hydration to protect effectively against detonation, a shell or barrier thickness of at least about 0.05 millimeter, usually from about 0.1 to 1.0 millimeter, provides for the better product. While a perfectly continuous, completely encapsulating shell is the ideal, products which are less perfectly encapsulated, but essentially completely encapsulated, are effective and can be admixed with alkaline synthetic detergents. A good rule of thumb to follow is that the shell thickness be from one-tenth to one-half that of the diameter of the diperacid core in the encapsulated granule.

Especially appropriate encapsulated product of this invention involves a diperisophthalic acid core encased in a hydrated magnesium sulfate barrier coating wherein the barrier coating contains from 0.5 to 4.0 (more notably 1 to 2.5) parts (by weight) water of hydration per part of diperisophthalic acid.

This water of hydration is in the form of the hydrates of magnesium sulfate containing water of hydration in the ratio of more than 2, preferably at least about 4, moles to 7 moles of water per mole of magnesium sulfate. Thus, usually the barrier shell contains from 0.5 or 1.5 to 2 or more (rarely above 5) parts by weight magnesium sulfate per part of diperisophthalic acid in these preferred products.

Effective preparation of hydrated salt encased diperphthalic acid particles entails, according to preferred embodiments of this invention, recourse to a special method. In such a method, water droplets of the diperphthalic acid are introduced into an agitated bed (ideally a fluidized bed) of water soluble hydratable salt (magnesium sulfate being the ideal salt). The salt which is used to form the bed initially is either non-hydrated or but partially hydrated (i.e., incompletely hydrated), thus containing less water of hydration than to be present in the final product. With a bed of magnesium sulfate, the bed particles are either anhydrous or but partially hydrated, i.e., contain less than 7 moles water of crystallization per mole of magnesium sulfate. Typically, the amount of such water is below 3 moles per mole of magnesium sulfate.

To insure that the diperisophthalic acid (or like peracid) is encased in a shell-like coating of hydrated magnesium sulfate, the respective relative particle sizes of the magnesium sulfate and the diperacid (in the aqueous slurry fed to the bed) are regulated, the magnesium sulfate particle size being less than that of the diperphthalic acid particles. Use of magnesium sulfate particles smaller than the diperacid particles apparently contributes to having the smaller particles encase the larger particles, i.e., the smaller particles attach to the larger particles.

Further contributing to the preparation of highly desirable products is the amount and fashion in which water is introduced into the system. In conducting the process, water fed to the bed (usually in the form of the water in the aqueous dispersion of a diperphthalic acid) is adjusted so that it together with any water of hydration contained by the magnesium sulfate particles (from which the bed is formed) constitutes the water of hydration content in the encapsulating coating of the final product.

Suspension of the bed particles so as to provide for a fluidized or otherwise suspended bed is attained by passing upwardly through the bed an inert gas, such as argon, neon, nitrogen, but notably air, usually at a temperature of up to 60° C. but rarely much higher than 80° C. To some extent, the gas temperature is determined by the temperature at which the desired hydrated salt is the stable hydrate.

Product is withdrawn from the bed, for example, in a batch operation after sufficient perphthalic acid has been added. In a continuous process, encapsulated product is withdrawn while continuing to add both salt and perphthalic acid to the system. Usually, the products are larger and even denser than the salt particles so that they tend to concentrate in the lower portion of the bed from where they are removed, continuously or periodically.

Particle size of magnesium sulfate used to provide the fluidized bed is from about 0.01 to 1 millimeter in their largest dimensions. Within this range, the precise particle size, among other things, is usually less than half, notably from one-twentieth to one-fifth that of the peracid particles fed to the bed.

Aqueous dispersions of peracid, notably diperisophthalic acid, particles are fed to the bed. These dispersions may be diperacid obtained, for example, directly from the process of manufacturing the peracid by slurrying the peracid in water. Diperisophthalic acid, the preferred perphthalic acid, is prepared, for example, according to the process described in U.S. Letters Patent 3,143,562, and in an article authored by Silbert, Siegel and Swern, Journal of Organic Chemistry, volume 27, pages 1336–1342. In this literature method, hydrogen peroxide and the phthalic acid (isophthalic) are reacted in the presence of methane sulfonic acid to produce a slurry of diperisophthalic acid, methane sulfonic acid, hydrogen peroxide and water, the latter being generated by the reaction and decomposition of the hydrogen peroxide. After filtering the slurry and washing the filter cake, a water wet filter cake of diperisophthalic acid is obtained, typically containing from about 0.2 to 1 or 2 pounds (although this may be higher) of water per pound of diperisophthalic acid. Dilution with water, if necessary, to a consistency of 1.2 to 2.0 (ideally about 1.5) pounds of water per pound of diperphthalic acid provides an aqueous slurry which is an excellent composition for feed to a fluidized bed of magnesium sulfate particles. In preferred practices, droplets of diperphthalic acid slurry are in the range of about 0.1 to 3 or 4 millimeters (maximum dimension) and are substantially globular or spherical in configuration. The configuration of the diperphthalic acid droplets influences the shape of the encapsulated product. Thus, to form spherical encapsulated particles, it is best to use spherical droplets of the acid slurry. Desirable encased products, nevertheless, may be provided when the diperphthalic acid droplets are other than substantially spherical or globular.

The following examples illustrate the manner in which diperphthalic acid particles may be encapsulated to provide formulations of the present invention:

EXAMPLE I

A fluidized bed reactor was provided by a 7 foot high, 6 inch diameter Pyrex pipe provided at the top with an air exhaust and at the bottom with an inlet for passing air upwardly through the bed of magnesium sulfate particles therein provided. A porous alumina plate near the bottom of the tube served as support for the magnesium sulfate particle. At a level of approximately 2½ feet above the alumina plate, an atomizing nozzle through which to discharge an aqueous slurry of diperisophthalic acid onto the upper part of the fluidized bed was provided.

The bed for fluidization was established by charging to the reactor 2000 grams of minus 70 mesh magnesium sulfate containing 17 weight percent water of hydration and passing nitrogen at room temperature up therethrough. With the partially hydrated magnesium sulfate particles fluidized by the feed of nitrogen at 75 pounds per square inch gauge pressure and room temperature to and up through the bed, an aqueous slurry (density of 1.2 grams per cubic centimeter) of diperisophthalic acid containing 40 percent by weight diperacid was atomized at the rate of 150–200 cubic centimeters per minute and the fine droplets were sprayed into the fluid bed of partially hydrated magnesium sulfate particles. Nitrogen at the rate of 22–23 liters per minute was used to atomize the slurry.

Diperisophthalic acid encapsulated in a protective coating of hydrated magnesium sulfate was withdrawn from the bed.

The particle size fractions and their composition were as follows:

TABLE I

| | Composition Weight percent | | | Mole Ratio, $H_2O/MgSO_4$ |
|---|---|---|---|---|
| | DPI[1] | $H_2O$ | $MgSO_4$ | |
| Mesh Size: | | | | |
| −8 +14 | 25.6 | 32.6 | 41.6 | 5.2 |
| −14 +32 | 23.2 | 30.5 | 46.3 | 4.4 |
| −32+ 70 | 19.6 | 40.0 | 40.4 | 6.6 |

[1] DPI=diperisophthalic acid.

The average particle size in the minus 14 to plus 32 mesh fraction (comprising approximately 50 percent of the diperisophthalic acid fed to the bed during the run) was approximately one millimeter in diameter. The diameter of the acid core was approximately 0.7 millimeter. The average particle size of the minus 8 to plus 14 mesh size was approximately 1.9 millimeters diameter with the diperisophthalic acid core being approximately 1.2 millimeters in diameter. Measurements indicate the hydrated magnesium sulfate encapsulating shell thickness of these particles to be between about 0.3 to 0.5 millimeter.

Samples of these products in the minus 14 to plus 32 mesh size range and minus 8 to plus 14 size range were then mixed with "Beads-O'-Bleach" base (an alkaline synthetic detergent) and sodium carbonate (the proportions being such that ½ cup of the mixture when added to a 20 gallon washing machine would give a pH of 9 and provide for 15 parts per million active oxygen in the solution). The mixtures were then capped in vials and stored at 60° C. for an extended period of time, after which the active oxygen content of the mixtures were measured and the percent decomposition per day at 60° C. there determined as to be manifold better than without the encapsulation, the minus 8 to plus 14 mesh product decomposing at a rate of 2.5 percent per day at 60° C. and the minus 14 to plus 32 mesh product decomposing at 9.4 percent per day at 60° C.

EXAMPLE II

Operating a fluidized bed of magnesium sulfate monohydrate screened to a minus 70 mesh size, droplets of an aqueous dispersion of diperisophthalic acid was dropped onto the fluidized bed. A product having an average particle size of 3/16 of an inch was produced. This product was dried at 5 to 10 millimeters water pressure and ambient temperature for 16 hours. Nearly spherical particles containing 17 percent diperisophthalic acid, 38 percent water by weight and the balance magnesium sulfate were obtained. Samples of such particulate composition were mixed with "Beads-O'-Bleach" base (obtained from the Purex Corporation and containing 63 percent by weight sodium sulfate, 3 percent synthetic detergent and 34 percent of sodium acid silicate and sodium polyphosphate) and stored. The mixture was small enough to pass through a 14 mesh screen.

EXAMPLE III

The process of the foregoing Example II was substantially duplicated and product was obtained which had an average particle size of approximately ⅛ inch.

EXAMPLE IV

The procedure of Example II was repeated, feeding an aqueous slurry of diperisophthalic acid containing 40 percent by weight acid. The product was screened to a minus 8 to plus 14 size and then dried and compounded as described in Example II.

Table II gives the storage test results regarding stability with products of Examples II, III and IV.

TABLE II

| | Average Particle Size (inches) | Composition Weight Percent | | | Percent Decomposition per day at— | |
|---|---|---|---|---|---|---|
| | | Diperisophthalic Acid | $H_2O$ | Additive | 40° C. | 60° C. |
| Example: | | | | | | |
| II | 3/16 | 17 | 38 | None | 0.43 | 0.58 |
| II | 3/16 | 17 | 38 | BOBB [1] | 0.40 | 0.57 |
| III | ⅛ | 16 | 30 | None | 0.28 | 0.57 |
| III | ⅛ | 16 | 30 | BOBB [1] | 0.35 | 0.61 |
| IV | 1/16 | 11 | 43.4 | None | Nil | 0.5 |
| IV | 1/16 | 11 | 43.4 | BOBB [1] | 0.2 | 0.3 |

[1] BOBB is "Beads-O'-Bleach" base.

EXAMPLE V

The product produced pursuant to Example IV was screened to a minus 14 plus 32 mesh size and then mixed with "Beads-O'-Bleach" base and found upon testing to have a decomposition rate of 2.3 percent per day at 60° C.

By comparison, a product formulated by simply mixing an aqueous solution of diperisophthalic acid containing approximately 40 percent by weight water with anhydrous magnesium sulfate and then producing a granulated product of minus 14 plus 32 mesh size upon mixture with "Beads-O'-Bleach" base decomposed at a rate of 42 percent per day at 60° C.

As illustrated by these examples, the preferred method for preparing magnesium sulfate hydrate encapsulated diperisophthalic acid particulate compositions entails feeding an aqueous dispersion of diperisophthalic acid to a fluidized or well agitated bed of magnesium sulfate particles, the hydrate content of which is less than 7 moles water of crystallization per mole of magnesium sulfate, notably up to 2 moles water of crystallization per mole of magnesium sulfate. Both the exact amount of water (and hence the diperisophthalic acid concentration) in the aqueous slurry fed to the fluidized bed and the extent to which the particulate magnesium sulfate in the bed is hydrated can be varied at least within the parameter that the total water available in the bed (however introduced thereinto) does not exceed the quantity required to provide in the encapsulating composition a hydrate containing 7 moles water of hydration, the highest hydrated magnesium sulfate likely to be used. Although the amount of water introduced into the bed should not, in the recommended practices, exceed 7 moles per mole of magnesium sulfate, all such water need not be added as hydrate in the magnesium sulfate charged and as water of the peracid slurry. It is recommended that a major portion, at least 50 percent, and more ideally all of the desired water of hydration in the encapsulated product be provided by water introduced as hydrate in the salt and as the medium in which the peracid is added.

It has also been found that the concentration in the aqueous slurry of the diperisophthalic acid, other things being equal, can affect the size and shape of the encapsulated products. With conditions otherwise being comparable, an aqueous diperisophthalic acid slurry containing 40 percent by weight of the acid resulted in particulate products wherein the particles were substantially spherical in their predominant shape characteristic. At a somewhat higher diperisophthalic acid concentration of between about 45 to 50 weight percent diperisophthalic acid, the primary spherical configuration of the particles was somewhat distorted to give more elongation.

Temperatures used in effecting the encapsulation (thus, the temperatures prevailing in the fluidized bed) are those at which the desired hydrated salt composition of the encasing barrier is stable. With the hydrated salts of magnesium sulfate, the fluid bed temperature should for best results be maintained below the temperature at which the salt releases water of hydration, for example, below 60° C. if the heptahydrate is the hydrated salt which is to be present in the shell. Higher temperatures are useful if lower hydrates of magnesium sulfate are to comprise the barrier coating.

Hydrated salts of magnesium sulfate are especially effective in preventing detonability of perphthalic acids and in providing adequate shelf life or, in other words, protection against decomposition and loss of active oxygen. The hydrated salts of magnesium sulfate additionally are ideal encapsulating compositions for providing granules of diperisophthalic acid which can be directly mixed with synthetic detergent formulations without undue loss of active oxygen content. Encapsulating compositions of other salts, notably hydrated water soluble salts, of the type described in copending application Serial No. 418,541 (the disclosure of which is herein incorporated by reference) can be utilized to provide encapsulated diperphthalic acid compositions. Hydrated salts described in said application Ser. No. 418,541 are those which retain water of hydration at temperatures of at least 30° C. but give up considerable water of hydration below 150° C. As disclosed in said application, hydrated salts which release all of their water of hydration at temperatures of from about 60° C. to 150° C., or more ideally between 85° C. to 130° C., offer advantages, but hydrated salts which release a portion of their water of hydration in these ranges are useful. Thus, salts which have a stable hydrated form above 150° C. are of use if they release water of hydration in the specified range; i.e., salts having several hydrates of use. Inert water soluble hydrated salts specifically named in said application include magnesium sulfate heptahydrate; the recognized hydrates of the various alkali metal aluminum sulfates such as sodium aluminum sulfate, potassium aluminum sulfate, ammonium aluminum sulfate and aluminum sulfate; aluminum nitrate .9 $H_2O$; magnesium nitrate .6 $H_2O$; calcium sulfate .2 $H_2O$; and sodium sulfate decahydrate. It is also possible to include inert water soluble diluents in the particles. Likewise, encapsulated granular products of other perphthalic acids such as mono- and diperacids of phthalic, terephthalic and the halogenated (particularly the fluorinated and chlorinated) isophthalic and terephthalic acids are provided according to this invention.

While the foregoing examples illustrate formulation of the contemplated encapsulated diperphthalic acid bleaching compositions with one specific synthetic detergent containing composition now used commercially, it is obvious the encapsulated products of this invention can be formulated with other synthetic organic detergents and formulations which include such detergents, the detergents so compoundable including the alkyl sulfates, sulfonates and the like. The resulting admixture of the encapsulated product and organic synthetic detergents may be charged, for example, as a combined formulation to the home laundry machine to effect the combined action of bleaching provided by the release of the active oxygen by the perphthalic acid and the detergent action of the synthetic detergent component. The encapsulated products of this invention may also be used by separately introducing into the home laundry washing machine or by mixing them just prior to introduction into such laundering devices.

While the present invention has been described with reference to specific details of certain embodiments, it is not intended that the invention be construed as limited to such specific details.

We claim:
1. A dry composition of matter comprising free-flowing solid particles having a core of perphthalic acid essentially completely encapsulated in a protective shell consisting essentially of hydrated water soluble salt which retains water of hydration below 30° C. but loses water of hydration below 150° C.

2. The composition of claim 1 wherein said salt is magnesium sulfate.

3. The composition of claim 1 wherein the perphthalic acid is diperisophthalic acid and the composition of said protective shell consists essentially of hydrated magnesium sulfate.

4. The composition of claim 1 wherein the encapsulated particles are in admixture with synthetic organic detergent.

5. The composition of claim 1 wherein the perphthalic acid is the diperisophthalic acid, and the protective shell consists essentially of a hydrated magnesium sulfate composition containing from about 2 to about 7 moles water of hydration per mole of magnesium sulfate, said composition of matter containing from 0.5 to 4.0 parts water of hydration per part by weight of diperisophthalic acid and 0.5 to 5 parts magnesium sulfate per part of diperisophthalic acid by weight.

6. The composition of claim 1 wherein the protective shell contains at least 0.25 part water of hydration per part by weight of the perphthalic acid.

7. The composition of claim 1 wherein the particles are substantially spherical and the thickness of the protective shell is from one-tenth to one-half the diameter of the perphthalic acid core.

8. A dry free-flowing composition of matter comprising solid particles of from 0.1 to 5 millimeters in size having a core of perphthalic acid essentially completely encased in a 0.05 to 1.0 millimeter thick protective shell consisting essentially of hydrated water soluble inorganic salt which retains water of hydration at temperatures below 30° C. and loses water of hydration below 150° C.

9. A method of producing dry solid encapsulated particles having a perphthalic acid core essentially completely encapsulated in a protective shell of hydrated water soluble salt, which retains water of hydration at temperatures below 30° C. but loses water of hydration up to 150° C. which comprises suspending particles of water soluble salt having less water of hydration than present in the protective shell of the solid encapsulated product in an inert gas stream, and feeding aqueous droplets of perphthalic acid to the suspended salt particles which droplets are larger than the salt particles whereby to encapsulate the perphthalic acid in a protective shell of hydrated water soluble salt, at least a major portion of the water of hydration present in the protective shell of the encapsulated product being provided by water from said aqueous droplets and said salt particles.

10. The method of claim 9 wherein the salt particles are between one-twentieth and one-fifth the size of the perphthalic acid droplets.

11. The method of claim 10 wherein the perphthalic acid is diperphthalic acid, the salt is magnesium sulfate and the inert gas is below 80° C.

12. The method of claim 9 wherein the perphthalic acid droplets are from 0.1 to 4 millimeters in diameter, and the salt particles are smaller than the droplets and between 0.01 and 1 millimeter in size.

References Cited

UNITED STATES PATENTS

| | | |
|---|---|---|
| 2,287,064 | 6/1942 | Reichert et al. ____ 260—502 X |
| 2,347,434 | 4/1944 | Reichert et al. _____ 260—502 |

(Other references on following page)

UNITED STATES PATENTS

| | | | |
|---|---|---|---|
| 2,423,451 | 7/1947 | Holuba | 117—100 X |
| 2,448,252 | 8/1948 | Cornthwaite et al. | 260—502 |
| 3,154,494 | 10/1964 | Speak et al. | 252—186 X |
| 3,202,731 | 8/1965 | Grevenstuk et al. | 117—100 X |
| 3,231,605 | 1/1966 | Blumbergs | 260—502 |
| 3,241,246 | 3/1966 | Pollock | 117—100 X |

FOREIGN PATENTS 560,389    9/1957   Belgium.

WILLIAM D. MARTIN, Primary Examiner

MATHEW R. P. PERRONE, Assistant Examiner

U.S. Cl. X.R.

252—89; 260—502